US012495894B2

(12) United States Patent
Sun

(10) Patent No.: US 12,495,894 B2
(45) Date of Patent: Dec. 16, 2025

(54) FOLDING TABLE

(71) Applicant: Ningbo Tenghao Outdoor Co., Ltd., Ningbo (CN)

(72) Inventor: Liang Sun, Ningbo (CN)

(73) Assignee: NINGBO TENGHAO OUTDOOR CO., LTD., Ningbo (CN)

( * ) Notice: Subject to any disclaimer, the term of this patent is extended or adjusted under 35 U.S.C. 154(b) by 224 days.

(21) Appl. No.: 18/234,860

(22) Filed: Aug. 16, 2023

(65) Prior Publication Data

US 2024/0057758 A1 Feb. 22, 2024

(30) Foreign Application Priority Data

Aug. 17, 2022 (CN) ......................... 202210988588.0

(51) Int. Cl.
*A47B 3/00* (2006.01)
*A47B 3/06* (2006.01)
(Continued)

(52) U.S. Cl.
CPC ............ *A47B 3/063* (2017.08); *A47B 3/0912* (2013.01); *A47B 13/02* (2013.01); *A47B 13/16* (2013.01);
(Continued)

(58) Field of Classification Search
CPC ......... A47B 3/063; A47B 3/0912; A47B 3/08; A47B 3/14; A47B 3/091; A47B 13/02; A47B 13/16; A47B 2200/11; A47B 2200/0035; A47B 2200/0075; A47B 2003/0821; A47C 4/04; H02S 20/30; H02S 40/38
(Continued)

(56) References Cited

U.S. PATENT DOCUMENTS 2,282,296 A * 5/1942 Hollentonder ........... A47B 3/10
297/139
2,461,385 A * 2/1949 Logue ...................... A47C 4/08
297/140
(Continued)

FOREIGN PATENT DOCUMENTS

CN 2439806 Y * 7/2001
CN 2645510 Y * 10/2004
(Continued)

OTHER PUBLICATIONS

CN215685525 English translation (Year: 2022).*
CN202919387 English translation (Year: 2013).*

*Primary Examiner* — Janet M Wilkens

(74) *Attorney, Agent, or Firm* — MATTHIAS SCHOLL P.C.; Matthias Scholl

(57) ABSTRACT

A folding table includes: a table top, a plurality of table legs hinged to the table top, a plurality of folding stools detachably fixed to the bottom of the table top, and folding support bars disposed between the table top and the table legs. The folding support bars include first support bars pivotally connected to the table legs and second support bars pivotally connected to the table top; the first support bars are hinged to the second support bars; a clamping part is disposed between each first support bar and each second support bar to position the first support bar and the second support bar when the folding table is in an unfolding state.

17 Claims, 3 Drawing Sheets

(51) Int. Cl.

| | |
|---|---|
| ***A47B 3/091*** | (2006.01) |
| ***A47B 13/02*** | (2006.01) |
| ***A47B 13/16*** | (2006.01) |
| ***A47C 4/04*** | (2006.01) |
| *A47B 3/08* | (2006.01) |
| *H02S 20/30* | (2014.01) |
| *H02S 40/38* | (2014.01) |

(52) U.S. Cl.
CPC ........ *A47C 4/04* (2013.01); *A47B 2003/0821* (2013.01); *A47B 2220/0075* (2013.01); *H02S 20/30* (2014.12); *H02S 40/38* (2014.12)

(58) Field of Classification Search
USPC ..... 108/132, 160, 125, 126, 129, 130, 50, 1, 108/35, 36, 38; 297/139, 140, 158.4, 17
See application file for complete search history.

(56) References Cited

U.S. PATENT DOCUMENTS

| | | | | | |
|---|---|---|---|---|---|
| 2,726,711 | A | * | 12/1955 | Britt | A47B 83/02 297/139 |
| 3,857,343 | A | * | 12/1974 | Greenberg | A47B 23/001 16/72 |
| 8,459,734 | B2 | * | 6/2013 | Herschler | A47B 3/14 297/440.1 |
| D992,318 | S | * | 7/2023 | Dai | D6/686 |
| D1,006,511 | S | * | 12/2023 | Sun | D6/691 |
| D1,040,583 | S | * | 9/2024 | Sun | D6/686 |
| 2024/0335029 | A1 | * | 10/2024 | Wang | A47B 3/0803 |

FOREIGN PATENT DOCUMENTS

| | | | | | |
|---|---|---|---|---|---|
| CN | 202919387 | U | * | 5/2013 | |
| CN | 112160624 | A | * | 1/2021 | E04B 7/16 |
| CN | 112555745 | A | * | 3/2021 | |
| CN | 215685525 | U | * | 2/2022 | |
| CN | 115399565 | A | * | 11/2022 | A47B 13/02 |
| CN | 218737729 | U | * | 3/2023 | A47B 13/02 |
| CN | 116458725 | A | * | 7/2023 | |
| GB | 2246286 | A | * | 1/1992 | A47B 3/0912 |
| WO | WO-2012015977 | A2 | * | 2/2012 | A47B 3/14 |

* cited by examiner

FOLDING TABLE

CROSS-REFERENCE TO RELATED APPLICATIONS

Pursuant to 35 U.S.C. § 119 and the Paris Convention Treaty, this application claims foreign priority to Chinese Patent Application No. 202210988588.0 filed Aug. 17, 2022 the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a folding table.

The folding tables are easy to transport, so they are widely used in the banquet, meeting, exhibition and other temporary hospitality places. Existing folding table are independent from stools, when in use, the table and the stools are separately stored and transported, which is inconvenient and occupies much space.

SUMMARY

To solve the aforesaid problems, the objective of the disclosure is to provide a folding table comprising folding stools which is easy to store and transport.

The folding table comprises: a table top, a plurality of table legs hinged to the table top, a plurality of folding stools detachably fixed to a bottom of the table top, and folding support bars disposed between the table top and the table legs; the folding support bars comprise first support bars pivotally connected to the table legs and second support bars pivotally connected to the table top; the first support bars are hinged to the second support bars; a clamping part is disposed between each first support bar and each second support bar to position the first support bar and the second support bar when the folding table is in an unfolding state.

In a class of this embodiment, the folding table further comprises a connection board; the connection board is disposed on the bottom of the table top, and the plurality of table legs are hinged to the connection board.

In a class of this embodiment, the plurality of table legs comprise a first pair of table legs and a second pair of table legs; the first pair of table legs each comprise an arc-shaped part, and in a folding state, the first pair of table legs and the second pair of table legs are overlapped on the bottom of the table top, and the first pair of table legs are covered by the second pair of table legs.

In a class of this embodiment, a first fixed rod is disposed between the first pair of table legs, and a second fixed rod is disposed between the second pair of table legs.

In a class of this embodiment, the first fixed rod is disposed on an inner side of the first pair of table legs, and the second fixed rod is disposed on an outer side of the second pair of table legs.

In a class of this embodiment, both the first fixed rod and the second fixed rod comprise a cushion block; and when the folding table is in a folding state, the cushion block is in contact with the folding stools.

In a class of this embodiment, the cushion block comprises a head for fixing the folding stools, a tail, and a connection part connecting the head and the tail; the tail is cone-shaped; the connection part comprises an annular groove; the first fixed rod and the second fixed rod comprise a plurality of through holes; the tail is disposed through the through holes, and the connection part is embedded in the through holes of the first fixed rod and the second fixed rod.

In a class of this embodiment, both the first pair of table legs and the second pair of table legs comprises fasteners, and when the folding table is in a folding state, the first pair of table legs and the second pair of table legs are locked by the fasteners.

In a class of this embodiment, the bottom of the table top comprises a plurality of grooves and a locating block disposed in each groove; the folding stools are disposed in the grooves one by one; and the folding stools each comprise a positioning groove matched with the locating block.

In a class of this embodiment, the bottom of the table top comprises a fixed belt; and the fixed belt is an elastic rope configured to fix the folding stools on the bottom.

In a class of this embodiment, the table top comprises a solar charging panel which is rechargeable by a battery; and the bottom of the table top comprises an atmosphere lamp connected to the battery when in use.

In a class of this embodiment, the clamping part is disposed on the first support bar; the second support bar comprises a recess matched with the clamping part; in an unfolding state, the clamping part is embedded in the recess to limit the rotation of the table legs.

In a class of this embodiment, the first support bar comprises a first lower locating hole and a first upper locating hole; the second support bar comprises a second upper locating hole and a second lower locating hole; the second support bar is hinged to the table top through the second upper locating hole; the first support bar is hinged to the table legs through the first lower locating hole; and the first support bar is hinged to the second support bar through the first upper locating hole and the second lower locating hole.

In a class of this embodiment, the first support bar further comprises two protrusions disposed equidistantly at two sides of the first upper locating hole; the second support bar comprises a fixing hole; when the folding table is in a folding or unfolding state, one of the two protrusions is limited in the fixing hole.

The following advantages are associated with the folding table of the disclosure: the bottom of the folding table can accommodate folding stools; the table and stools are stored and transported synchronously, and the folding table and folding stools are fixed in sets, thus preventing the loss of the stools in the transportation process.

Figure 1:
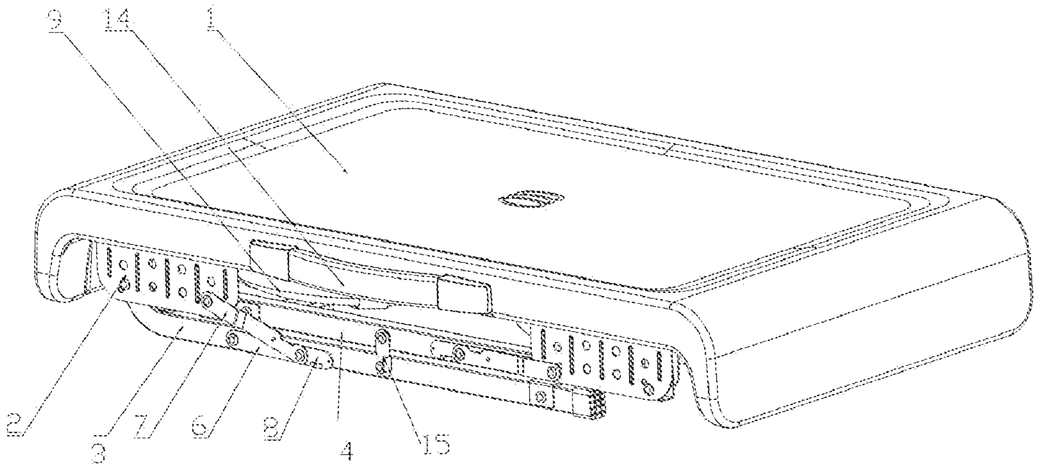
FIG. 1 is a top view of a folding table according to one embodiment of the disclosure in a folding state.
Figure 2:
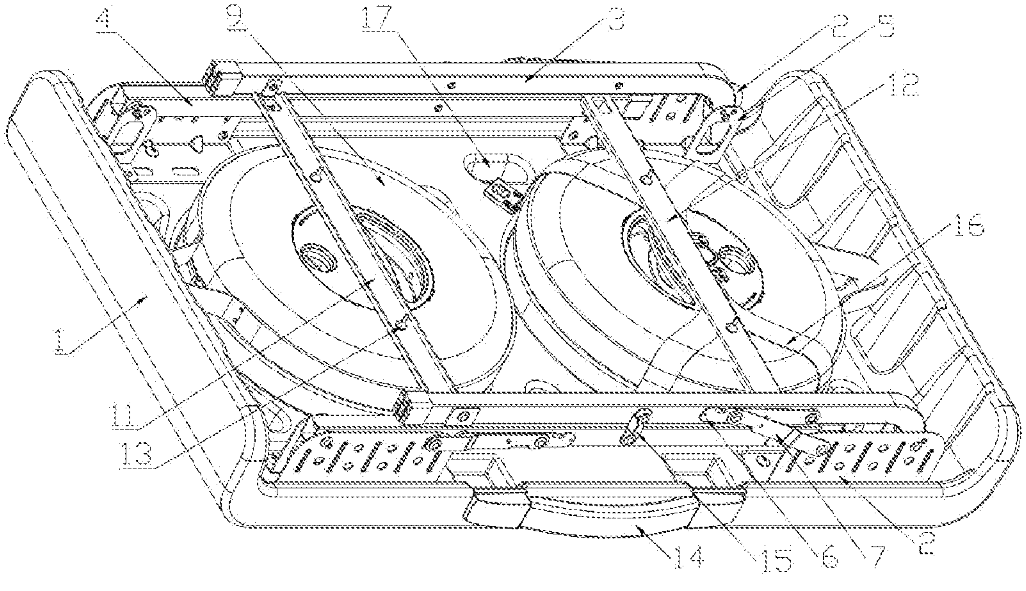
FIG. 2 is a bottom view of a folding table according to one embodiment of the disclosure in a folding state.
Figure 3:
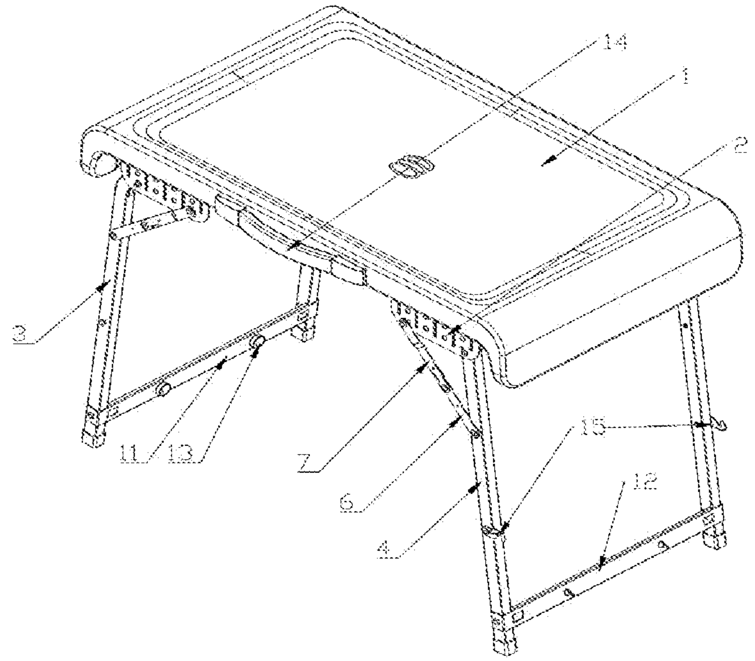
FIG. 3 is a top view of a folding table according to one embodiment of the disclosure in an unfolding state.
Figure 4:
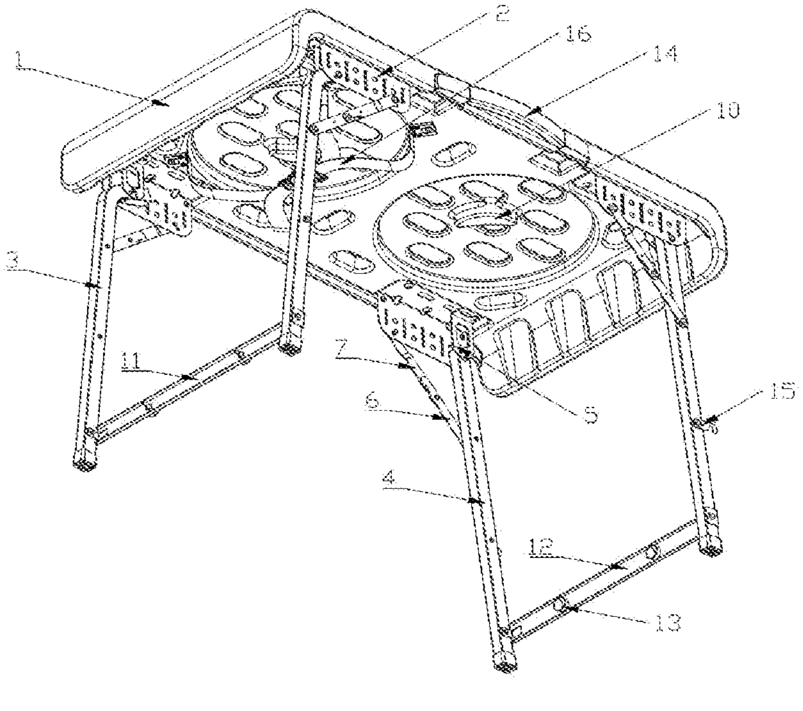
FIG. 4 is a bottom view of a folding table according to one embodiment of the disclosure in an unfolding state.
Figure 5:
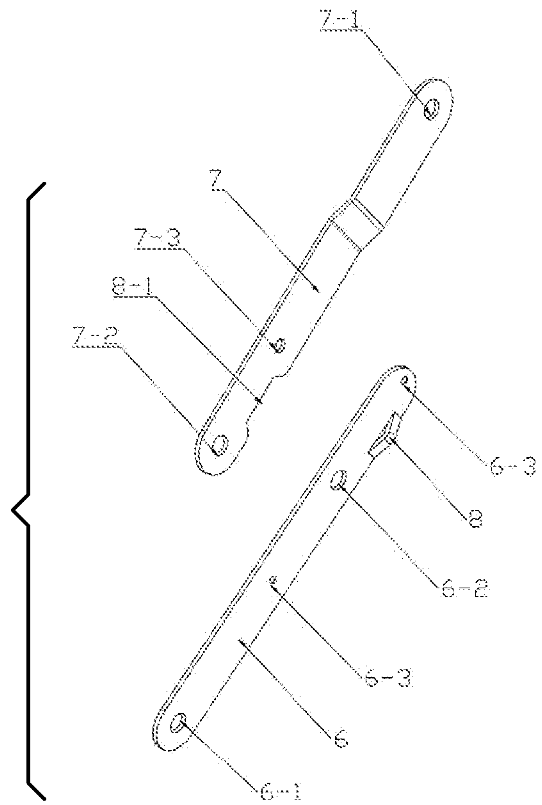
FIG. 5 is a schematic diagram of support bars of a folding table according to one embodiment of the disclosure.
Figure 6:
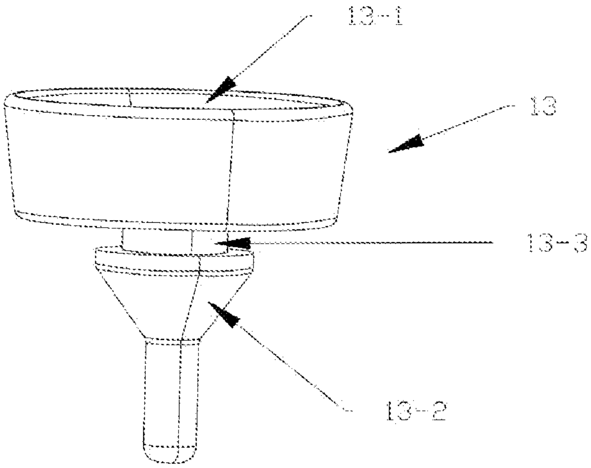
FIG. 6 is a schematic diagram of a cushion block of a folding table according to one embodiment of the disclosure.

In the drawings, the following reference numbers are used: 1. Table top; 2. Connection board; 3. First pair of table legs; 4. Second pair of table legs; 5. Bracket; 6. First support bar; 6-1. First lower locating hole; 6-2. First upper locating hole; 6-3. Protrusion; 7. Second support bar; 7-1. Second upper locating hole; 7-2. Second lower locating hole; 7-3. Fixing hole; 8. Clamping part; 8-1. Recess; 9. Folding stool; 10. Locating block; 11. First fixed rod; 12. Second fixed rod; 13. Cushion block; 13-1. Head; 13-2. Tail; 13-3. Connection part; 14. Handle; 15. Fastener; 16. Fixed belt; 17. Reinforcement block.

DETAILED DESCRIPTION

To further illustrate the disclosure, embodiments detailing a folding table are described below. It should be noted that the following embodiments are intended to describe and not to limit the disclosure.

The disclosure provides a folding table comprises a table top 1 and a plurality of table legs. A connection board 2 is disposed on the bottom of the table top 1, and the plurality of table legs are hinged to the table top 1 through the connection board. The table legs can be folded or unfolded by means of the hinged structure. To strengthen the stability of the hinged part of the table legs, the folding table further comprises a bracket 5. The bracket 5 and the connection board 2 are both fixed to the bottom of the table top 1 and are respectively located on both sides of the hinged part of the table legs. That is, the table legs are hinged to the connection board 2 and the bracket 5. The bottom of the table top 1 comprises two circular grooves, or one or more, each of which holds one folding stool 9. The folding stools 9 are positioned in the grooves in the bottom of the table top 1 through a locating block 10. The folding stools 9 each comprise a positioning groove matched with the locating block 10. The grooves and the locating blocks 10 can effectively prevent the folding stools 9 from moving or rotating horizontally at the bottom of the table top 1 after the folding table is folded.

A fixed belt 16 is disposed near the grooves. The fixed belt 16 is an elastic rope with a buckle, for fixing the folding stools 9 in the grooves at the bottom of the table top 1, so that the folding stools 9 will not be detached from the bottom of the table top 1 even if the folding table is in the unfolding use state. The number of fixed belt 16 is determined by the number of folding stools 9 that the folding table is capable of carrying, or the fixed belt 16 may be provided for some of the grooves and not for other grooves. The fixed belt 16 can also be clasps or other fixing means, as long as it is possible to realize that when the folding table is in the unfolding state, the folding stools 9 will not be detached from the bottom of the table top 1.

To beautify the table top and facilitate the storage of the folded stools 9 and the folded table legs, the two sides of the table top 1 extend towards the bottom of the table top 1 to form a bending section.

To increase the strength of the table top 1, the table top 1 is designed as a double-layer structure with a hollow interior. The bottom of the table top 1 comprises a plurality of concave reinforcement blocks 17, and the inner side of the bending section of the table top 1 is also provided with concave reinforcement blocks to support the top of the table top 1, so that the table top 1 has a strong stability and supporting force.

The plurality of table legs comprise a first pair of table legs 3 and a second pair of table legs 4. The upper part of the first pair of table legs 3 is a curved structure, and the lower part is a vertical structure; the second pair of table legs 4 are entirely a vertical structure. In this way, when the folding table is folded, the first pair of table legs 3 and the second pair of table legs 4 are overlapped under the bottom of the table top 1, and the first pair of table legs 3 are covered by the second pair of table legs 4, thus saving the occupied space of the folding table.

The folding support bars comprise first support bars 6 pivotally connected to the table legs and second support bars 7 pivotally connected to the table top 1; the first support bars 6 are hinged to the second support bars 7; a clamping part 8 is disposed between each first support bar 6 and each second support bar 7 to position the first support bar 6 and the second support bar 7 when the folding table is in an unfolding state. Specifically, the clamping part 8 is disposed on the first support bar 6; the second support bar 7 comprises a recess 8-1 matched with the clamping part 8; in an unfolding state, the clamping part 8 is embedded in the recess 8-1 to limit the rotation of the table legs. The first support bar 6 comprises a first lower locating hole 6-1 and a first upper locating hole 6-2; the second support bar 7 comprises a second upper locating hole 7-1 and a second lower locating hole 6-2; the second support bar 7 is hinged to the table top through the second upper locating hole 7-1; the first support bar 6 is hinged to the table legs through the first lower locating hole 6-1; and the first support bar 6 is hinged to the second support bar 7 through the first upper locating hole 6-2 and the second lower locating hole 7-2. The first support bar 6 further comprises two protrusions 6-3 disposed equidistantly at two sides of the first upper locating hole 6-2; the second support bar 7 comprises a fixing hole 7-3; when the folding table is in a folding or unfolding state, one of the two protrusions 6-3 is limited in the fixing hole 7-3, so that the folding table is relatively fixed in the storage or use state, preventing structural changes of the folding table.

Further, a first fixed rod 11 is disposed between the first pair of table legs 3, and a second fixed rod 12 is disposed between the second pair of table legs 4. When the folding table is folded for storage, the first fixed rod 11 and the second fixed rod 12 press the folding stools 9 against the bottom of the table top 1 for fixing the folding stool 9, thereby facilitating the storage of the folding stools 9 and preventing the folding stools 9 from being lost during transportation. Both the first pair of table legs 3 and the second pair of table legs 4 comprises fasteners 15, and when the folding table is in a folding state, the first pair of table legs 3 and the second pair of table legs 4 are locked by the fasteners, thus preventing the folding table from falling apart during transportation.

The first fixed rod 11 is disposed on an inner side of the first pair of table legs 3, and the second fixed rod 12 is disposed on an outer side of the second pair of table legs 4. In a folded state, the first fixed rod 11 and the second fixed rod 12 are in the same plane, thereby ensuring that the relative positions between the first fixed rod 11/the second fixed rod 12 and the folding stools 9 are stable, which can effectively fix the folding stools at the bottom of the table top.

Both the first fixed rod 11 and the second fixed rod 12 comprise a cushion block 13, for example, made of rubber material; and when the folding table is in a folding state, the cushion block 13 is in contact with the folding stools 9.

To prevent the cushion block 13 from falling off due to friction or heat, the cushion block 13 is designed in a special shape. Specifically, the cushion block 13 comprises a head 13-1 for fixing the folding stools, a tail 13-2, and a connection part 13-3 connecting the head and the tail; the tail is cone-shaped; the connection part comprises an annular groove; the first fixed rod 11 and the second fixed rod 12 comprise a plurality of through holes; the tail 13-2 is disposed through the through holes, and the connection part 13-3 is embedded in the through holes of the first fixed rod 11 and the second fixed rod 12.

The table top 1 comprises a handle 14 on one side, which facilitates the transportation of the folding table in the folding state.

The table top 1 comprises a solar charging panel which is rechargeable by a battery; and the bottom of the table top 1 comprises an atmosphere lamp connected to the battery when in use, thus ensuring lighting and atmosphere when used in the wild.

It will be obvious to those skilled in the art that changes and modifications may be made, and therefore, the aim in the appended claims is to cover all such changes and modifications.

What is claimed is:

1. A folding table, comprising:

a table top comprising a bottom;

a plurality of table legs hinged to the table top;

a plurality of folding stools detachably fixed to the bottom of the table top; and a plurality of folding support bars disposed between the table top and the table legs;

wherein:

the folding support bars comprise first support bars pivotally connected to the table legs and second support bars pivotally connected to the table top;

the first support bars are hinged to the second support bars; a clamping part is disposed between each first support bar and each second support bar to position the first support bar and the second support bar when the folding table is in an unfolding state; and the plurality of table legs comprise a first pair of table legs and a second pair of table legs; the first pair of table legs each comprise an arc-shaped part, and in a folding state, the first pair of table legs and the second pair of table legs are overlapped on the bottom of the table top, and the first pair of table legs are covered by the second pair of table legs.

2. The folding table of claim 1, further comprising a connection board disposed on the bottom of the table top, and the plurality of table legs being hinged to the connection board.

3. The folding table of claim 1, wherein a first fixed rod is disposed between the first pair of table legs, and a second fixed rod is disposed between the second pair of table legs.

4. The folding table of claim 3, wherein the first fixed rod is disposed on an inner side of the first pair of table legs, and the second fixed rod is disposed on an outer side of the second pair of table legs.

5. The folding table of claim 3, wherein both the first fixed rod and the second fixed rod comprise a cushion block; and when the folding table is in a folding state, the cushion block is in contact with the folding stools.

6. The folding table of claim 5, wherein the cushion block comprises a head for fixing the folding stools, a tail, and a connection part connecting the head and the tail; the tail is cone-shaped; the connection part comprises an annular groove; the first fixed rod and the second fixed rod comprise a plurality of through holes; the tail is disposed through the through holes, and the connection part is embedded in the through holes of the first fixed rod and the second fixed rod.

7. The folding table of claim 1, wherein both the first pair of table legs and the second pair of table legs comprises fasteners, and when the folding table is in a folding state, the first pair of table legs and the second pair of table legs are locked by the fasteners.

8. The folding table of claim 1, wherein the bottom of the table top comprises a fixed belt; and the fixed belt is an elastic rope configured to fix the folding stools on the bottom.

9. The folding table of claim 1, wherein the clamping part is disposed on the first support bar; the second support bar comprises a recess matched with the clamping part; in an unfolding state, the clamping part is embedded in the recess to limit the rotation of the table legs.

10. The folding table of claim 1, wherein the first support bar comprises a first lower locating hole and a first upper locating hole; the second support bar comprises a second upper locating hole and a second lower locating hole; the second support bar is hinged to the table top through the second upper locating hole; the first support bar is hinged to the table legs through the first lower locating hole; and the first support bar is hinged to the second support bar through the first upper locating hole and the second lower locating hole.

11. The folding table of claim 10, wherein the first support bar further comprises two protrusions disposed equidistantly at two sides of the first upper locating hole; the second support bar comprises a fixing hole; when the folding table is in a folding or unfolding state, one of the two protrusions is limited in the fixing hole.

12. A folding table, comprising:

a table top comprising a bottom;

a plurality of table legs hinged to the table top;

a plurality of folding stools detachably fixed to the bottom of the table top; and a plurality of folding support bars disposed between the table top and the table legs;

wherein:

the folding support bars comprise first support bars pivotally connected to the table legs and second support bars pivotally connected to the table top;

the first support bars are hinged to the second support bars; a clamping part is disposed between each first support bar and each second support bar to position the first support bar and the second support bar when the folding table is in an unfolding state; and the bottom of the table top comprises a plurality of grooves and a locating block disposed in each groove; the folding stools are disposed in grooves one by one; and the folding stools each comprise a positioning groove matched with the locating block.

13. The folding table of claim 12, further comprising a connection board disposed on the bottom of the table top, and the plurality of table legs being hinged to the connection board.

14. The folding table of claim 12, wherein the bottom of the table top comprises a fixed belt; and the fixed belt is an elastic rope configured to fix the folding stools on the bottom.

15. The folding table of claim 12, wherein the clamping part is disposed on the first support bar; the second support bar comprises a recess matched with the clamping part; in an unfolding state, the clamping part is embedded in the recess to limit the rotation of the table legs.

16. The folding table of claim 12, wherein the first support bar comprises a first lower locating hole and a first upper locating hole; the second support bar comprises a second upper locating hole and a second lower locating hole; the second support bar is hinged to the table top through the second upper locating hole; the first support bar is hinged to the table legs through the first lower locating hole; and the first support bar is hinged to the second support bar through the first upper locating hole and the second lower locating hole.

17. The folding table of claim 16, wherein the first support bar further comprises two protrusions disposed equidistantly at two sides of the first upper locating hole; the second support bar comprises a fixing hole; when the folding table is in a folding or unfolding state, one of the two protrusions is limited in the fixing hole.

* * * * *